United States Patent [19]

Goodman

[11] Patent Number: 5,400,979
[45] Date of Patent: Mar. 28, 1995

[54] FISHING REEL

[76] Inventor: Howard Goodman, 11732 Pine Tree Dr., Fairfax, Va. 22033

[21] Appl. No.: 216,952

[22] Filed: Mar. 24, 1994

[51] Int. Cl.⁶ .......................................... A01K 89/012
[52] U.S. Cl. .................................... 242/225; 242/241
[58] Field of Search ................ 242/225, 226, 227, 228, 242/241, 242

[56] References Cited

U.S. PATENT DOCUMENTS

| | | | |
|---|---|---|---|
| 1,150,575 | 8/1915 | Blodgett | 242/241 |
| 2,179,413 | 11/1939 | Kolosso | 242/227 |
| 2,896,875 | 7/1959 | Reed | 242/225 |
| 3,032,290 | 5/1962 | Wallace | 242/226 |
| 3,544,030 | 12/1970 | Daniels | 242/241 |
| 3,735,934 | 5/1973 | Black | 242/225 |
| 3,876,162 | 4/1975 | Chun et al. | 242/241 |
| 4,725,013 | 2/1988 | Epperson | 242/241 |
| 4,892,267 | 1/1990 | Webb | 242/228 |

FOREIGN PATENT DOCUMENTS 286378 2/1953 Switzerland .................. 242/241

Primary Examiner—Daniel P. Stodola
Assistant Examiner—Eileen A. Dunn
Attorney, Agent, or Firm—Parkhurst, Wendel & Rossi

[57] ABSTRACT

A fishing reel of simple design that includes a cylindrical outer housing, a cylindrical inner housing including a roller slot formed at an angle to an axis passing through the center of the inner housing, a slide bar for mounting the inner housing within the outer housing while permitting the reciprocal movement of the inner housing, a drive shaft including a roller rotatably coupled to a main body of the drive shaft, an electric motor coupled to a first end of the drive shaft, and a reel releasably mounted on a second end of the drive shaft. The roller is fitted within the roller slot of the inner housing and contacts at least one rolling surface of the roller slot as the drive shaft is rotated by the electric motor, thereby causing the reciprocal movement of the inner housing within the outer housing.

5 Claims, 1 Drawing Sheet

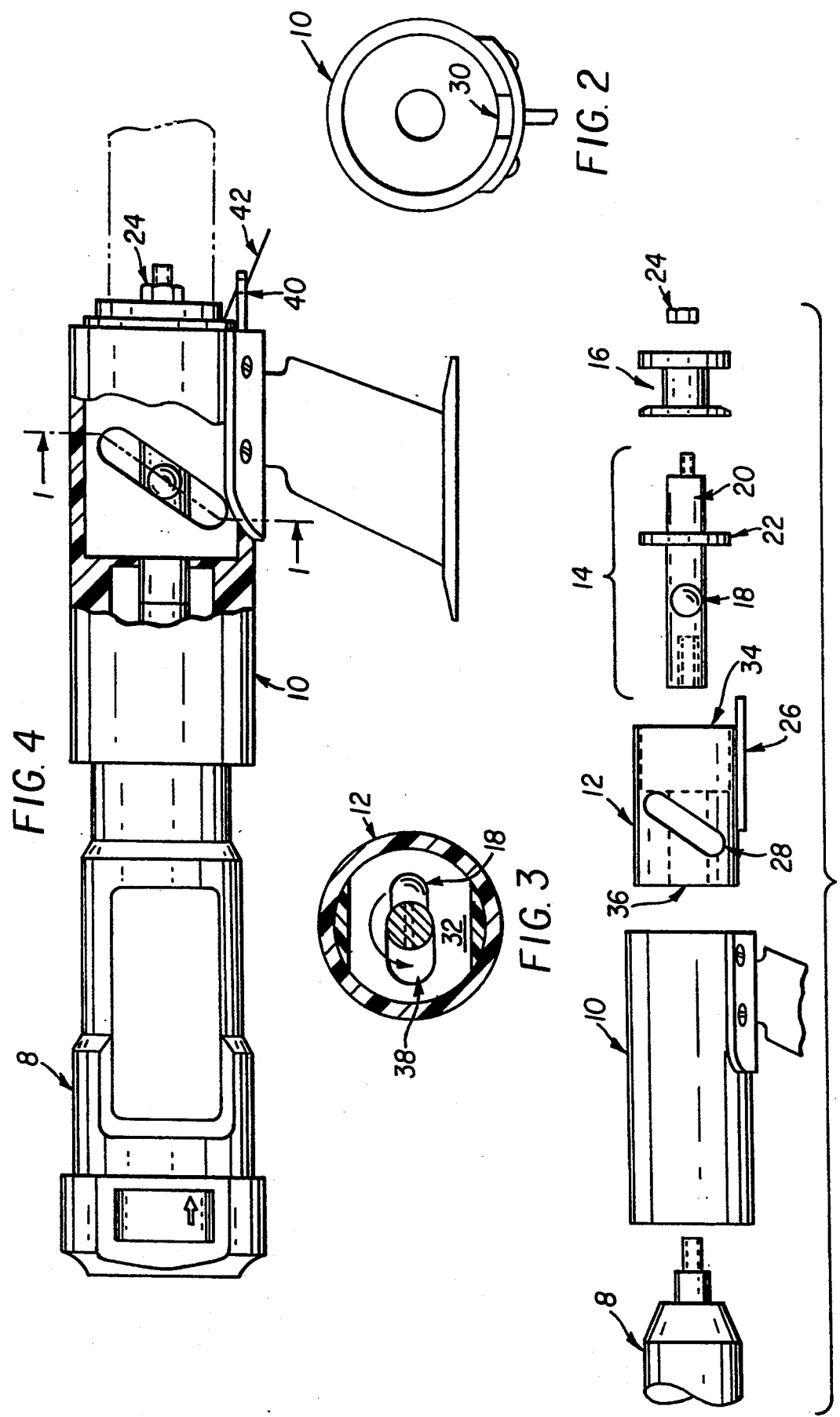

FISHING REEL

FIELD OF THE INVENTION

The invention relates in general to fishing reels. More specifically, the invention relates to fishing reel of simplified mechanical design that minimizes the number of parts required for its manufacture.

BACKGROUND OF THE INVENTION

There are many different types of fishing reels currently available, and a number of attempts have been made to improve the operation of the fishing reels by a variety of mechanisms. Conventional fishing reels, however, have become more and more complex in their mechanical design, thereby increasing the expense of the reels. The present invention is directed to providing a fishing reel of simple design that can be easily manufactured.

SUMMARY OF THE INVENTION

The invention provides a fishing reel of simple design that includes a cylindrical outer housing, a cylindrical inner housing including a roller slot formed at an angle to an axis passing through the center of the inner housing, mounting means for mounting the inner housing within the outer housing while permitting the reciprocal movement of the inner housing, a drive shaft including a roller rotatably coupled to a main body of the drive shaft, an electric motor coupled to a first end of the drive shaft, and a reel releasably mounted on a second end of the drive shaft. The roller is fitted within the roller slot of the inner housing and contacts at least one rolling surface of the roller slot as the drive shaft is rotated by the electric motor, thereby causing the reciprocal movement of the inner housing within the outer housing.

BRIEF DESCRIPTION OF THE DRAWINGS

The invention will be described in greater detail with reference to the drawings, wherein:

FIG. 1 is an exploded view of a fishing reel in accordance with the invention;

FIG. 2 is a front view of an outer cylindrical housing of the fishing reel illustrated in FIG. 1;

FIG. 3 is a partially exposed side view of the assembled fishing reel; and

FIG. 4 is a sectional view of the assembled fishing reel shown in FIG. 3 taken along line I—I.

DETAILED DESCRIPTION OF THE INVENTION

A fishing reel in accordance with the invention is illustrated in FIG. 1. The fishing reel includes a cylindrical outer housing 10, a cylindrical inner housing 12, a drive shaft 14, and a reel 16. The drive shaft 14 includes a roller 18 rotatably attached to the main body 20 of the drive shaft 14. A reel stop 22, in the form of a plastic disc, is also attached to the drive shaft 14 by a set screw (not shown). The drive shaft 14 is preferably threaded on both ends to permit the attachment of an electric motor 8 and a reel retaining tension nut 24. A slide bar 26 is attached to a lower portion of the inner housing 12. The slide bar 26 fits in a slot 30 provided in the outer housing 10 as shown in FIG. 2. The inner housing 12 includes a roller slot 28 that is angled with respect to a central axis of the inner housing 12 to provide rolling surfaces 32 for the roller 18 as shown in FIG. 3.

The fishing reel is assembled by aligning the slide bar 26 with the slot 30 and sliding the inner housing 12 into the outer housing 10. The drive shaft 14 is then inserted into the inner housing 12. It should be noted that the inner housing 12 includes a reel cavity 34 and a central drive shaft hole 36 as shown in phantom in FIG. 1. The central drive shaft hole 36 includes an elongated slot 38 between the reel cavity 34 and the roller slot 28, which allows the roller 18 to pass into the roller slot 28 as the drive shaft 14 is inserted in the inner housing 12. A slight rotation of the drive shaft 14 brings the roller 18 into contact with the rolling surface 32 thereby preventing the drive shaft 14 from slipping back out of the inner housing 12. An electric motor 8, preferably variable speed—for example a DC electric screw driver with a threaded bit—is then attached to the drive shaft 14. The reel 16 then slides onto the drive shaft 14 until it abuts the reel stop 22. The tension nut 24 is then threaded onto the drive shaft 14 to retain the reel 16. The tension nut 24 is adjusted to vary the braking force applied to the reel 16 by the reel stop 22. FIG. 4 illustrates an assembled fishing reel attached to a mounting bracket 44, which can also be formed integral with the outer housing 10 if so desired.

During operation, the rotation of the motor 8 causes the drive shaft 14 to rotate. As the drive shaft 14 rotates, the roller 18 rolls along the rolling surface 32 applying a force to the inner housing 12. It should be noted that the roller 18 can make contact with a rolling surface on both sides of the slot 18, although only the front rolling surface 32 is illustrated in FIG. 3. The applied force causes the inner housing 12 to move back and forth in a reciprocating motion. The slide bar 26 is provided with a hole 40 through which a fishing line 42 is threaded and attached to the reel 16. The reciprocating motion of the inner housing 12 causes the fishing line 42 to move back and forth across the face of the reel 16 as it is rotated or spooled.

The simple construction and minimal number of components of the fishing reel insures that the reel can be manufactured at a minimal cost. The major components of the reel, including the outer housing 10, the inner housing 12 and the reel 16 can be readily formed by injection molding. Although the main body 20 of the drive shaft 14 is preferably metal, it can also be manufactured by injection molding if so desired. In such a case, the reel stop 22 can be formed integral with the main body.

The invention has been described with reference to certain preferred embodiments thereof. It will be understood, however, that modifications and variations are possible within the scope of the appended claims. For example, other mechanical configurations other than the use of a single slide bar may be utilized to retain the inner housing within the outer housing while permitting reciprocal movement. The fishing line can also be thread to the reel by means other that the hole in the slide bar. For example, a threading loop or hook can be provided on the front face of the inner cylindrical to thread the line to the reel.

What is claimed is:

1. A fishing reel comprising:
    a cylindrical outer housing; a cylindrical inner housing including a roller slot formed at an angle to a longitudinal axis passing through the center of the inner housing; mounting means for mounting the inner housing within the outer housing while permitting the reciprocal movement of the inner housing relative to the outer housing; a drive shaft, including a roller rotatably coupled to a main body of the drive shaft, located along the longitudinal axis passing through the center of the inner housing; an electric motor coupled to a first end of the drive shaft, and a reel releasably mounted on a second end of the drive shaft;

wherein the roller is fitted within the roller slot of the inner housing and contacts at least one rolling surface of the roller slot as the drive shaft is rotated by the electric motor, thereby causing the reciprocal movement of the inner housing within the outer housing.

2. A fishing reel as claimed in claim 1, wherein the mounting means comprises a slide bar coupled to the inner housing and the outer housing further comprises a slot for receiving the slide bar.

3. A fishing reel as claimed in claim 2, wherein the slide bar extends past the outer edge of the inner housing and includes an opening for threading a line to the reel.

4. A fishing reel as claimed in claim 1, wherein the outer housing, the inner housing and the reel comprise plastic material.

5. A fishing reel as claimed in claim 1, wherein the electric motor is variable speed.

* * * * *